(No Model.)
J. A. GORGAS.
FIFTH WHEEL FOR VEHICLES.
No. 512,695. Patented Jan. 16, 1894.
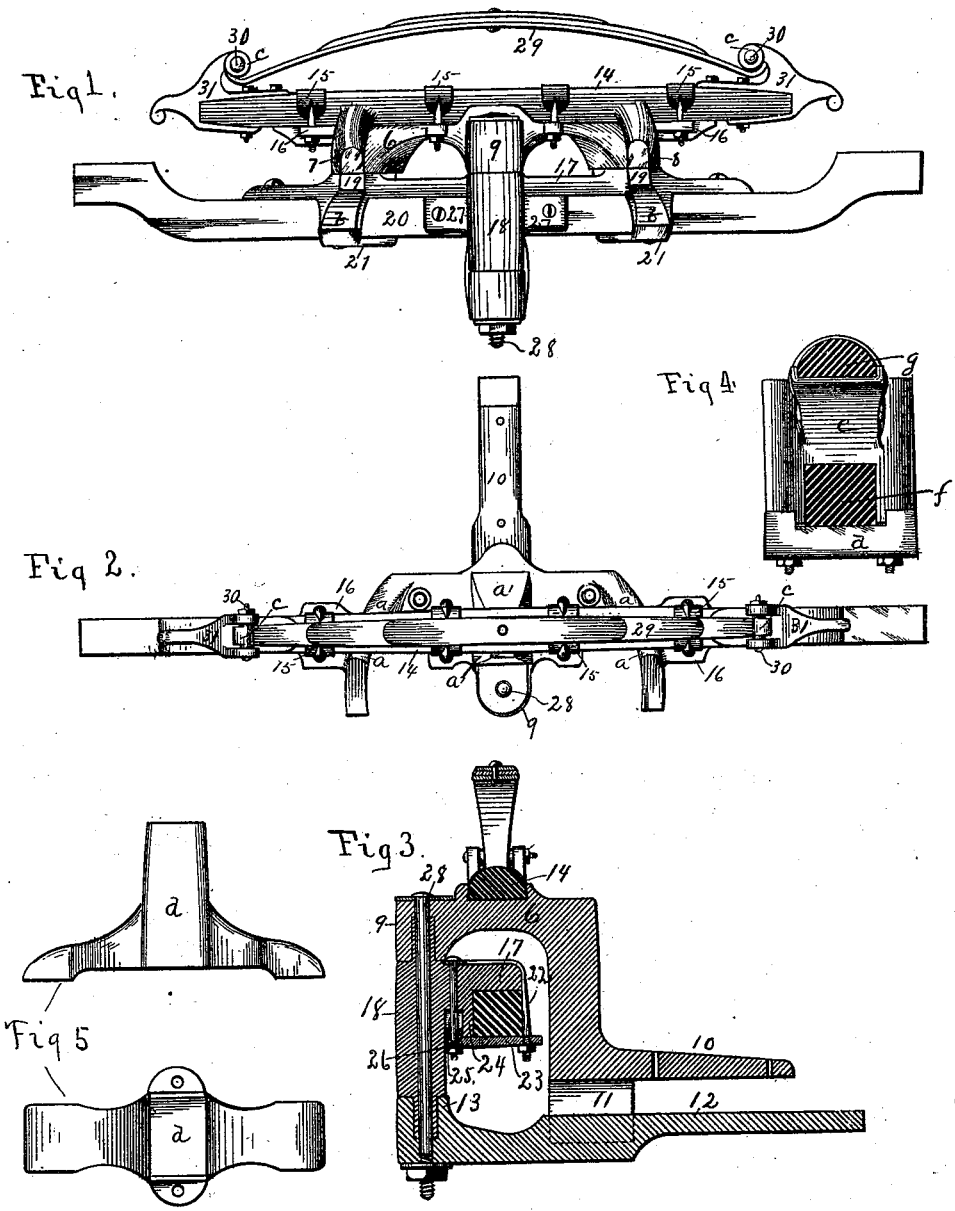
WITNESSES:
L. C. Leoty
Harley S. Dunn
INVENTOR
John A. Gorgas.
BY
Toulmin & McCarty
ATTORNEYS

UNITED STATES PATENT OFFICE.

JOHN A. GORGAS, OF DAYTON, OHIO.

FIFTH-WHEEL FOR VEHICLES.

SPECIFICATION forming part of Letters Patent No. 512,695, dated January 16, 1894.

Application filed July 21, 1893. Serial No. 481,152. (No model.)

*To all whom it may concern:*

Be it known that I, JOHN A. GORGAS, a citizen of the United States, residing at Dayton, in the county of Montgomery and State of Ohio, have invented certain new and useful Improvements in Fifth-Wheel Gear; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in front gear and coupling for carriages and other light vehicles.

The improvements have especial reference to the peculiar construction of the fifth wheel, the spring, and the coupling, all of which will be fully described in the specification and the specific points of invention mentioned in the claims.

In the drawings herewith annexed, Figure 1 is a front elevation of my improved fifth wheel gear; Fig. 2 a plan view; Fig. 3 a vertical section through the center; Fig. 4 an end view of a form of clip that may be used when the spring is applied to the rear axle, said axle and the spring bar appearing in cross section; Fig. 5 a detail detached view of one of the bearing clips for the rear axle to be used in connection with my improved spring.

6 represents the head block plate having segmental bearing lugs 7 and 8 constituting the upper member of the fifth wheel.

9 is a forwardly projecting boss integral with the parts just named, through which a socket extends, and a recess to receive the socket boss 18 of the transient plate, and 10 represents the drop reach which is also integral with the head block plate; this drop reach is provided with downwardly projecting ears 11, one of which is shown in Fig. 3, which serve as supports against lateral movement of the reach iron 12; this reach iron is provided with a boss 13 through which a socket extends, and a recess to receive the socket boss 18 of the transient plate.

14 designates the head block plate bar which is seated transversely on said head block plate between lugs $a$, $a$, and $a'$, $a'$, projecting vertically from the same, the latter named lugs projecting from the median portion thereof; the bar 14 is fixed in its seat by clips 15 15 passing through eyes in ledges 16 16.

17 designates the transient plate having a forwardly projecting socket piece 18, and segmental bearing lugs 19 19 integral therewith, constituting the lower member of the fifth wheel; this plate is constructed with downwardly projecting lugs $b$, $b$, similar to lugs $a$, $a$, on the upper member, between which the axle 20 is fast, being secured by screws passing through the ends of said plate, and by couplings 21 21 which are secured to lugs $b$, $b$, against the under surface of the axle; a further security of the axle is effected by a clip 22 which extends over the transient plate downwardly in the rear of the axle where it takes an eye in the brace plate 23, to which it is secured by a nut. This clip is also secured by a bolt which passes through the transient plate in the rear of the socket boss 18 and enters the brace plate 23 at that point. See Fig. 3. The transient plate in the rear of the socket portion 18 is constructed with a downwardly projecting lip 24, forming a recess 25 in the rear of said socket piece in which lip 26 of the brace plate 23 enters and receives substantial support or bearing against lateral movement; by the peculiar construction of this socket portion of the transient plate, a take up of axles of different diameters is allowable, which is accomplished by decreasing the depth of the lip 24; this allows the brace plate 23 to hug the axle. The socket portion of the transient plate is provided with flanges 27 27 through which screws enter to the axle to afford additional rigidity of these parts.

28 indicates the coupling bolt extending through the sockets heretofore described; by thus pivoting the fifth wheel gear in the front of the axle, I dispense with the major portion of the rearward part of said fifth wheel, which enables the use of a comparatively short gear, and gives greater lightness and neatness of build to the vehicle.

29 denotes a semi-elliptical spring terminating in solid ends $c$—$c$ having sockets therethrough for bolts 30 30 which pass through inwardly curved ears of brackets 31 31 made fast to bar 14. As the body of the spring departs from the solid ends, it tapers inwardly as shown in Fig. 2, in order that the resilient portion near said ends will not come in contact with the inner surface of the bracket ears when under vibratory motion. This spring by reason of its being mounted directly on the head block bar has all the advantages of the full elliptic spring in that it receives its motion from the center of the fifth wheel, and not from the axle or ground wheels, and it may be equally available on the rear axle by providing the bearings shown in Figs. 4 and 5.

In this application $d$ and $e$ indicate lower and upper clips bolted to the rear axle $f$; the spring bar $g$ is clipped to and has bearing on the upper clip $e$.

It will be understood that by dispensing with the bar 14 a full elliptic spring may be used with head block plate, also a single or double reach may be used, and either wrought or malleable iron, and the fifth wheel may be used with axle bed. I have found in practice that it is preferable to make the surface of the fifth wheel and the sockets of chilled iron.

Having described my invention, what I claim, and desire to secure by Letters Patent, is—

1. The combination of the head block having segmental bearings 7 and 8, forming the upper member of the fifth wheel, and socket boss 9; the transient plate having similar bearings 19 19, forming the lower member of the fifth wheel, and socket boss 18; the reach 12 with socket boss 13 which together with the boss 9 on the head block forms a bearing for the transient plate; said bosses also forming a socket in the extreme front of the fifth wheel for the coupling bolt 28; and means for fixing the transient plate to the axle, substantially as herein described.

2. The combination of the head block with forwardly projecting boss 9 having a socket therein; the reach 12 having socket boss 13; the transient plate 17 with socket boss 18 the ends of which are journaled in the said bosses 9 and 13; said transient plate also provided with a lip 24 forming a recess in the rear of boss 18; the brace plate 23 provided with a lip 26 adapted to enter said recess; the clip 22, and means for maintaining said clip and the plate 23 in contact with the axle, substantially as herein described.

3. In a fifth wheel, the combination of the head block plate provided with lugs $a$—$a$ and $a'$—$a'$ projecting vertically therefrom; the head block bar 14 attached to said head block plate, between said lugs; the brackets 31—31 with inwardly curved ears attached to the ends of said bar; the spring 29, mounted on said brackets, the ends of said spring being solid with an aperture therein, and tapering to a less diameter, as it leaves said solid ends, whereby the vibrations will not cause any part of said spring to come in contact with the bearings, as herein described.

In testimony whereof I affix my signature in presence of two witnesses.

JOHN A. GORGAS.

Witnesses:
R. JAY McCARTY,
S. A. DICKSON.